United States Patent [19]

Hester

[11] Patent Number: 5,608,426
[45] Date of Patent: Mar. 4, 1997

[54] PALETTE MANAGEMENT FOR APPLICATION SHARING IN COLLABORATIVE SYSTEMS

[75] Inventor: John Hester, Oak Lawn, Ill.

[73] Assignee: NCR Corporation, Dayton, Ohio

[21] Appl. No.: 128,014

[22] Filed: Sep. 28, 1993

[51] Int. Cl.$^6$ .............................. G09G 5/06; G06F 5/00; G06F 13/38; G06F 3/153
[52] U.S. Cl. ...................... 345/153; 395/131; 395/200.04
[58] Field of Search ............................ 340/721; 395/200, 395/200.04, 131; 364/514; 345/153, 2

[56] References Cited

U.S. PATENT DOCUMENTS

| | | | |
|---|---|---|---|
| 5,008,853 | 4/1991 | Bly et al. ..................................... | 345/2 |
| 5,025,249 | 6/1991 | Seiler et al. . | |
| 5,206,934 | 4/1993 | Naef, III ................................. | 395/200 |
| 5,502,458 | 3/1996 | Braudaway et al. ..................... | 345/153 |
| 5,537,579 | 7/1996 | Hiroyuki ................................. | 395/131 |

FOREIGN PATENT DOCUMENTS

| | | |
|---|---|---|
| 0065424 | 11/1982 | European Pat. Off. . |
| 0148659 | 7/1985 | European Pat. Off. . |
| 0597797 | 5/1994 | European Pat. Off. . |
| 9109378 | 6/1991 | WIPO . |

OTHER PUBLICATIONS

Windows API Bible, Conger, Chaps 12,21, 28, 29, 30 1991.
Newbridge Networks, "Inverse Multiplexing and So Much More", pp. 1–6.
Newbridge Networks, "Product Overview", pp. 7–32.
Newbridge Networks, "3500 Main Street", pp. 33–36.
Newbridge Networks, "4600 Main Street", pp. 37–41.
Newbridge Networks, "3604 Main Street", pp. 42–45.
Newbridge Networks, "3612 Main Street", pp. 46–49.
Newbridge Networks, "3624 Main Street", pp. 50–53.
Newbridge Networks, "8230 Main Street", pp. 54–57.
Newbridge Networks, "8231 Main Street", pp. 58–61.
Compression Labs, Inc. (CLL), "Eclipse Videoconferencing System, Model 8100", pp. 62–65.
Compression Labs, Inc. (CLI), "Special Report, Aug. 20, 1993", pp. 66–69.
Compression Labs, Inc. (CLI), "Compare. Why Pay 50–100% More to Get All The Videoconferencing Features You Need?" pp. 70–71.

(List continued on next page.)

Primary Examiner—Larry D. Donaghue
Assistant Examiner—Mark H. Rinehart
Attorney, Agent, or Firm—George H. Gates

[57] ABSTRACT

A method and apparatus for managing palettes in collaborative systems. This includes one or more host computers connected to one or more remote computers, wherein an image displayed on the host computer is substantially simultaneously displayed on the remote computer. The invention recognizes when a change is made to a system palette on the host computer, and communicates those changes to the remote computer. A logical palette is created on the remote computer to reflect the system palette on the host computer, and the changes made therein. A system palette on the remote computer may be updated to reflect the logical palette, and the changes made therein, depending upon whether the collaborative system is active or idle. When sharing images between the host computer and the remote computer, the images must first be translated from their device dependent format using the system palette on the host computer into a device independent image. The device independent image, like the system palette, is transmitted from the host computer to the remote computer. The device independent image is then translated into a device dependent image suitable for display on the remote computer using the logical palette maintained by the collaborative system on the remote computer.

10 Claims, 3 Drawing Sheets

Microfiche Appendix Included
(2 Microfiche, 141 Pages)

OTHER PUBLICATIONS

Compression Labs, Inc. (CLI), "Eclipse in Action", pp. 72–73.

Compression Labs, Inc. (CLI), "Rembrandt II–Radiance Videoconferencing System", pp. 74–75.

Compression Labs, Inc. (CLI), Letter entitled "Pacific Data Images Uses New Radiance Videoconferencing System to Increase Efficiency of Client Contact", p. 76.

Compression Labs, Inc. (CLI), "Compressing Distances, Expanding Opportunities", pp. 77–88.

PicturesTel Corporation, "PictureTel Live PCS 100 Personal Visual Communications Systems", pp. 89–90.

PicturesTel Corporation, "System 4000 High Performance Dial–Up Video Conferencing", pp. 91–98.

PictureTel Corporation, "System 1000 Affordable Dial–Up Videoconferencing", pp. 99–104.

PictureTel Corporation, "PictureTel: A Chronology", pp. 105–109.

ShareVision, A subsidiary of Creative Technology, Ltd., "ShareView 300", pp. 110–111.

ShareVision, A subsidiary of Creative Technology, Ltd., "ShareView 3000" pp. 112–113.

Smart Technologies, Inc., "Smart 2000 Conferencing System", pp. 114–117.

Smart Technologies, Inc., "Q & A Questions and Answers, Smart 2000 Conferencing System", pp. 118–121.

Smart Technologies, Inc., "Training with Smart 2000" pp. 122–123.

Smart Technologies, Inc., "Smart Solutions", pp. 124–127.

Preliminary Information from Share Vision Technology Inc., 1992, PPIN0992 Rev. B, Hoshi, Nakamura, Nakamura, "Broadband ISDN Multimedia Workstations and Group TeleWorking Systems", *Hitachi Review* vol. 40 (1991), No. 3, pp. 217–222.

Watabe, Sakata, Maeno, Fukuoka and Ohmori, "Multimedia Desktop Conferencing System: Mermaid", *NEC Research And Development* vol. 32, No. 1 pp. 158–167, Jan. 1991.

Aring & Robinson; "Support For Informal Communication in Distributed Group Work", *Wideband Communication*, pp. 864–870.

Werner B. Korte, "Multimedia BK Technology for the Support of Distributed Group Work", *Widebank Communication*, pp. 872–878.

Visit video, Northern Telecom brochure.

Telegraphics Design Document Draft May 22, 1992.

"Desk Top Conferencing for Windows" Brochure by Fujitsu Networks Industry, Inc.

Moskowitz, Robert, "The Electronic Meeting" *Presentation Products Magazine,* Sep., 1990, pp. 24–32.

Piturro, Marlene C., "Computer Conferencing: Brainstorming Across Time and Space", *Management Review,* Aug., 1969, pp. 43–50.

"IBM Person to Person" Brochure, UltiMedia, IBM United States, Oct., 1991.

"Smart 2000 Conferencing System Brochure", Smart Technologies Inc., Calgary, AB Canada.

DeskTop Conferencing Novell® Local Area Networks Product Description, Fujitsu Networks Industry, Inc.

Street, April, "Videoconferencing On Any Wire", *Mac Week,* Oct., 5, 1993.

Bartino, Jim, "At These Shouting matches, No One Says A Word" *Business Week,* Jun., 11, 1990.

Andrews, Edmund L., "Plugging the Gap Between E–Mail and Video Conferencing" *New York Time,* Sunday, Jun. 23, 1991, p. 9.

Palme, Jacob, "Distributed Computer Conferencing", Elsevier Science Publishers B.V. (North–Holland), pp. 137–145.

Kelly, John N., "Technology That Support Meetings" *Patricia Seybold's Office Computing Report,* Sep., 1988.

Wynne, Bye, "Group Support Systems and Electronic Collaboration", American Management Association *Information Management Forum,* May, 1991.

Wynne, Bye, "Groupware and Your Future", American Management Association *Information Management Forum,* Nov., 1989.

"Texaco Contributes to Group Decision Support Services Project", *Campus News, MMR,* Summer,1990, p. 23.

Southworth, Mason,, "How to Have an 'Electronic' Brainstorm", No. 1, 1990, pp. 12 and 13.

Richman, Louis S., "Software Catches The Team Spirit", Reprinted through the courtesy of the Editors of Fortune.

LaPlante, Alice, "Workgroup Idea Still Unclear to Users", *Info World,* Dec.11, 1989, vol. 11, Issue 5.

"Meeting Support An Emerging Market" pp. 69–75.

Ententé, Tuenkey Electronic Classroom.

"The Year 2000: Expect Meetings to Change, Not Decline", *The 3M Meeting Management News,* vol. 3, No. 1.

LaPlant, Alice, "IBM Study: PCs Aid in Decision Process", *Info World,* vol. 11, Issue 49.

Panko, Raymond R., Presentation "Patterns of Organizational Communication".

"Brainstorming by Modem", *The New York Times,* Sunday, Mar. 24, 1991.

"Study Focuses On Use Of Rules in Meetings", *The 3M Meeting Management Institute,* vol. 3, No. 3, Dec. 1991.

Johansen, Robert "Teams for Tomorrow", Institute for the Future, pp. 521–534.

Rodden, Tom, "A Survey of CSCW Systems", *Interacting with Computers,* vol. 3, No. 3 (1991) pp. 319–353.

5,608,426

PALETTE MANAGEMENT FOR APPLICATION SHARING IN COLLABORATIVE SYSTEMS

The present invention generally relates to computer networking, and in particular, to a method and apparatus for managing display palettes in collaborative systems.

CROSS-REFERENCE TO RELATED APPLICATIONS

This application is related to:

Application Ser. No. 08/035,092, entitled "*Remote Collaboration System,*" by Carleton et al., filed on Mar. 19, 1993, and assigned to NCR Corporation.

Application Ser. No. 08/035,091, entitled "*Remote Collaboration System,*" by Fitzpatrick et al., filed on Mar. 19, 1993, and assigned to NCR Corporation.

Application Ser. No. 08/033,602, entitled "*Remote Collaboration System,*" by Pommier et al., filed on Mar. 19, 1993, and assigned to NCR Corporation.

Application Ser. No. 08/034,313, entitled "*Remote Collaboration System,*" by Schwartz et al., filed on Mar. 19, 1993, and assigned to NCR Corporation.

Application Ser. No. 08/128,012 (NCR Docket No. 5876) entitled "*Accelerated Replication of Multiple Computer Displays,*" by Hester et al., filed on the same date herewith, and assigned to NCR Corporation.

Application Ser. No. 08/128,013 (NCR Docket No. 5877) entitled "*Annotation of Computer Video Displays,*" by Carleton et al., filed on the same date herewith, and assigned to NCR Corporation.

Application Ser. No. 08/128,018, (NCR Docket No. 5878) entitled "*Direct Capture of a Video Conferencing Data,*" by Alonso-Cedo et al., filed on the same date herewith, and assigned to NCR Corporation.

Application Ser. No. 08/128,018, (NCR Docket No. 5879) entitled "*Method and Apparatus for Display of Video Images in a Video Conferencing System,*" by Carleton et al., filed on the same date herewith, and assigned to NCR Corporation.

Application Ser. No. 08/128,018 (NCR Docket No. 5887) entitled "*Collaborative Video Conferencing System,*" by Schwartz et al., filed on the same date herewith, and assigned to NCR Corporation.

All the above-identified applications are incorporated by reference herein.

REFERENCE TO A MICROFICHE APPENDIX

A microfiche appendix, containing two (2) microfiche and 141 total frames is filed herewith.

BACKGROUND OF THE INVENTION

The present invention generally relates to a collaborative system for sharing applications between computers, and in particular, to a method and apparatus for managing display palettes in collaborative systems. Many computer programs use as many colors as are available from the computer's video subsystem to allow the programs to have as much visual impact as possible. This is fine when displaying a computer program on one system, because the computer program has full control over the system, but special techniques had to be developed to allow the computer program to be displayed identically when shown simultaneously on many computers.

OBJECTS OF THE INVENTION

It is therefore an object of the present invention to provide an improved system for managing display palettes in a collaborative system.

It is a further object of the invention to provide a system for displaying images on remote computers in a form substantially identical and simultaneously with the display of the images on a host computer.

It is a further object of the invention to provide a system for recognizing when a change is made to a system palette on the host computer, and then communicating those changes to the remote computer.

It is a further object of the invention to provide a system for creating a logical palette on the remote computer to reflect the information stored in the system palette on the host computer, and for updating a system palette on the remote computer to reflect the information stored in the logical palette depending upon whether the collaborative system is active or idle.

It is a further object of the invention to provide a system for sharing images between the host computer and the remote computer, wherein the invention translates images from a device dependent format into a device independent image using the system palette on the host computer, transmits the device independent image from the host computer to the remote computer, and then translates the device independent image into a device dependent image suitable for display on the remote computer using the logical palette maintained by the collaborative system on the remote computer.

SUMMARY OF THE INVENTION

To overcome the limitations in the prior art described above, and to overcome other limitations that will become apparent upon reading and understanding the present specification, the present invention discloses a method and apparatus for managing palettes in collaborative systems comprising one or more host computers connected to one or more remote computers, wherein an image displayed on the host computer is substantially simultaneously displayed on the remote computer. The invention recognizes when a change is made to a system palette on the host computer, and communicates those changes to the remote computer. A logical palette is created on the remote computer to reflect the system palette on the host computer, and the changes made therein. A system palette on the remote computer may be updated to reflect the logical palette, and the changes made therein, depending upon whether the collaborative system is active or idle. When sharing images between the host computer and the remote computer, the images must first be translated from their device dependent format using the system palette on the host computer into a device independent image. The device independent image, like the system palette, is transmitted from the host computer to the remote computer. The device independent image is then translated into a device dependent image suitable for display on the remote computer using the logical palette maintained by the collaborative system on the remote computer.

BRIEF DESCRIPTION OF THE DRAWINGS

Referring now to the drawings in which like reference numbers represent corresponding parts throughout.

DESCRIPTION OF A PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
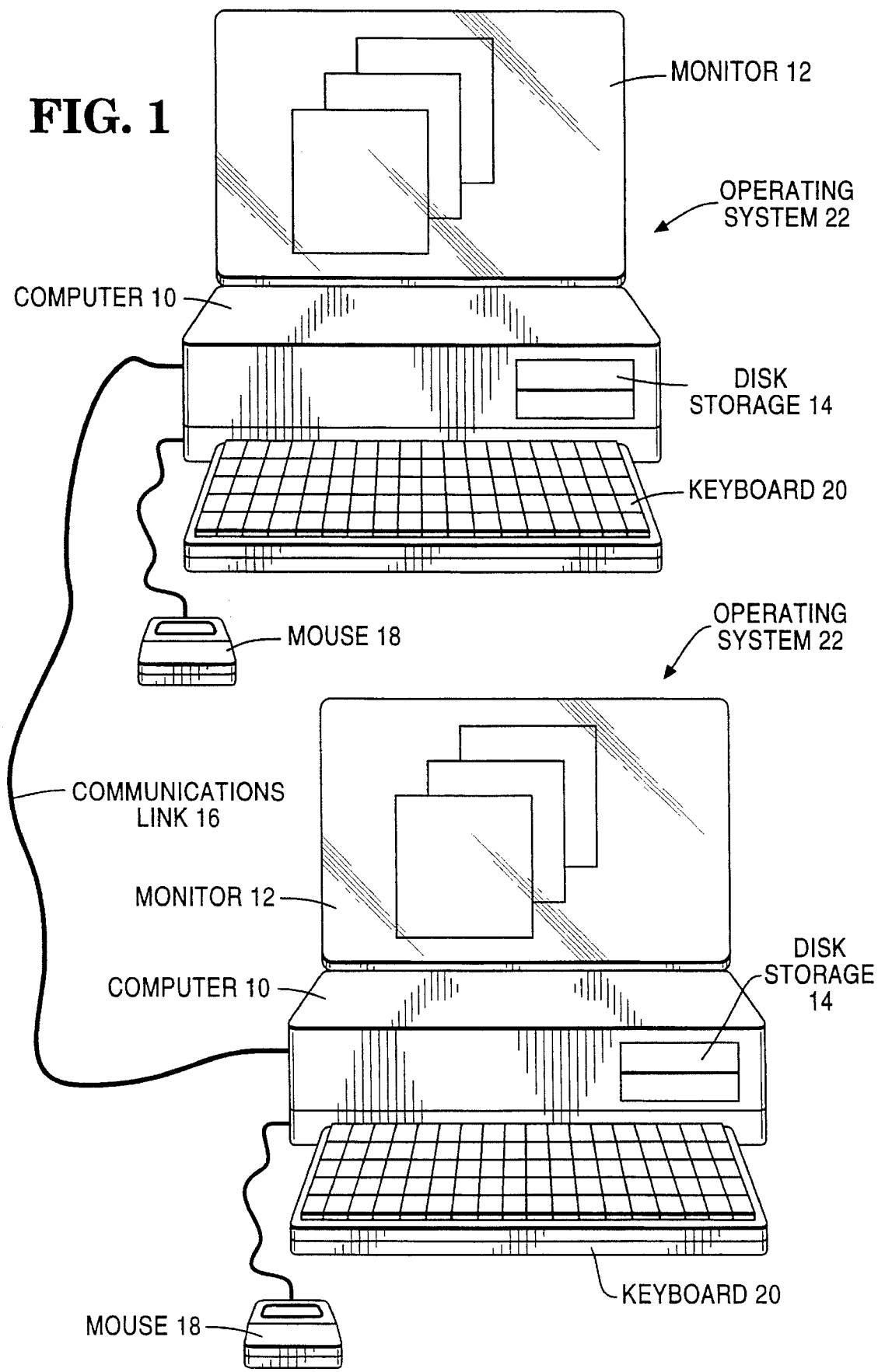
FIG. 1 is a block diagram illustrating one possible embodiment the hardware comprising the present invention.

FIG. 1 is a block diagram illustrating one possible embodiment of the hardware comprising the present invention. The present invention is typically incorporated into a computer network including two or more personal computers 10 coupled together for communication. It is envisioned that attached to each computer 10 will be a monitor 12, disk storage 14, and communications link 16. Also included in the preferred embodiment are input devices, for example, a mouse pointing device 18 and a keyboard 20. Each computer 10 operates under the control of a message-driven multi-tasking, graphical user interface (GUI) 22, such as the WINDOWS™ operating system or environment sold by Microsoft Corporation.

In the present invention, each of the computers 10 forms part of a collaborative system. A user at one computer 10 (termed the host computer 10) interacts with one or more applications occupying one or more windows of the GUI 22. The collaborative system simultaneously replicates selected windows displayed on the computer 10, rather than the entire display, at one or more remote computers 10. This selective replication allows users to maintain private areas on their monitors 12 that are not shared. Note that it is possible for both the host and the remote computers 10 to run a plurality of other applications at the same time because of the multi-tasking capabilities of the GUI 22.

Although the collaborative system replicates the selected display on the host computer 10 to the remote computers 10, so that all users view similar displays on their respective monitors 12, the displays could be different, because of the following factors:

(1) different monitors 12 have different properties, such as resolution and color capability;

(2) different display protocols (EGA, VGA, S-VGA, etc.) represent graphics images differently and have different color capability;

(3) different GUIs 22 or different versions of the same GUI 22 may have different display conventions; and (4) users of the remote computers 10 may have altered some of the characteristics of the display or window thereby causing a deviation from that viewed on the host computer 10.

Although there may be differences in the appearances of the display between the host computer 10 and the remote computers 10 relative to each other, the basic content of all the displays should be the same. The palette management system of the present invention allows information to be displayed on the remote computer 10 in an almost identical state as it is on the host computer 10.

Figure 2:
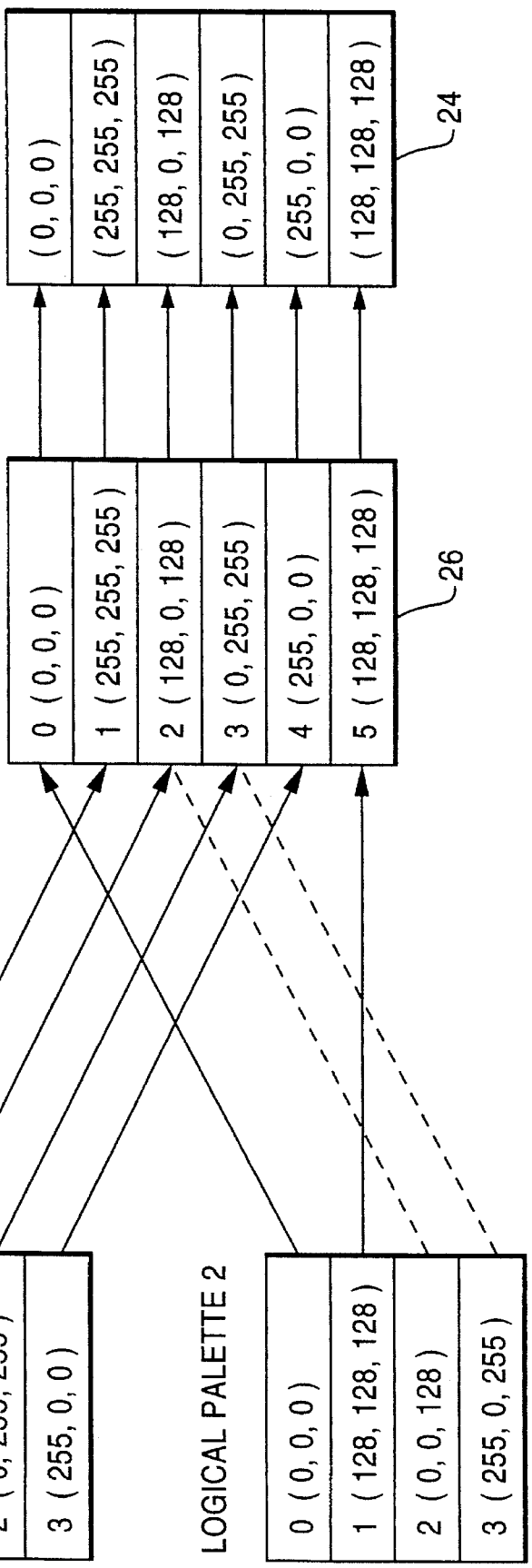
FIG. 2 is a block diagram illustrating one possible method for controlling the display of information.

FIG. 2 is a block diagram illustrating one possible method for controlling the display of information. Under WINDOWS™, there are three types of "palettes" used to control the display of colors on the monitor 12: hardware palettes 24, system palettes 26 and logical palettes 28. Each palette comprises one or more entries, wherein each entry is identified by an index value and contains three color fields corresponding to the Red, Green, and Blue (RGB) color values used to create a desired color represented by that entry. The hardware palette 24 stores the entries representing the colors actually displayed on the monitor 12. The system palette 26 is used by applications to access and manipulate the hardware palette 24. Each application, in turn, maintains one or more logical palettes 28 that reflect the desired color selections for the application. There is normally only one hardware palette 24, and there is a 1:1 mapping between the system palette 26 and the hardware palette 24. Each computer 10 can have only one system palette 26, but every application can have as many logical palettes 28 as it needs.

The logical palettes 28 maintain index entries that reference entries in the system palette 26; the system palette 26 maintains index entries that reference entries in the hardware palette 24. The index value points to the nearest matching color in the palette which it references. In FIG. 2, the solid lines connecting the logical palettes 28 to the system palette 26 and the system palette 26 to the hardware palette 24 represent an exact mapping where the RGB colors are identical; the dotted lines represent a mapping where the RGB colors provide the closest possible color match. Sometimes it is necessary to resort to closest color matching because the number of colors in the logical palettes 28 exceed the number of possible entries in the system palette 26.

An application that is actively executing on the computer 10 is permitted to provide an exact mapping from its logical palette 28 to the system palette 26; all idle applications must settle for the remaining closest possible color match. In FIG. 2, for example, Logical Palette 1 is marked as the "Active Window," and thus it adds its colors to the system palette 26 first, so that its colors look the best (i.e., most exact) of any palette-based application in the computer 10. For a collaborative system, this technique must be extended to ensure that the display of information on remote computers 10 is as close as possible to the display on the host computer 10. Further, the overhead in accomplishing this task must be minimized.

According to the present invention, whenever a change is made to the system palette 26 of a host computer in a collaborative system, these changes are then communicated to a remote computer 10 to recreate the system palette 26 as a logical palette 28 managed by the collaborative system on the remote computer 10. If the collaborative system is actively executing on the remote computer 10, it is permitted to access and manipulate the system palette 26 on the remote computer 10 so that it is an exact match to its logical palette 28, i.e., the system palette 26 from the host computer 10. If the collaborative system is idle on the remote system 10, it is permitted to access and manipulate the system palette 26 on the remote computer 10 so as to provide the closest possible color match to its logical palette 28.

Figure 3:
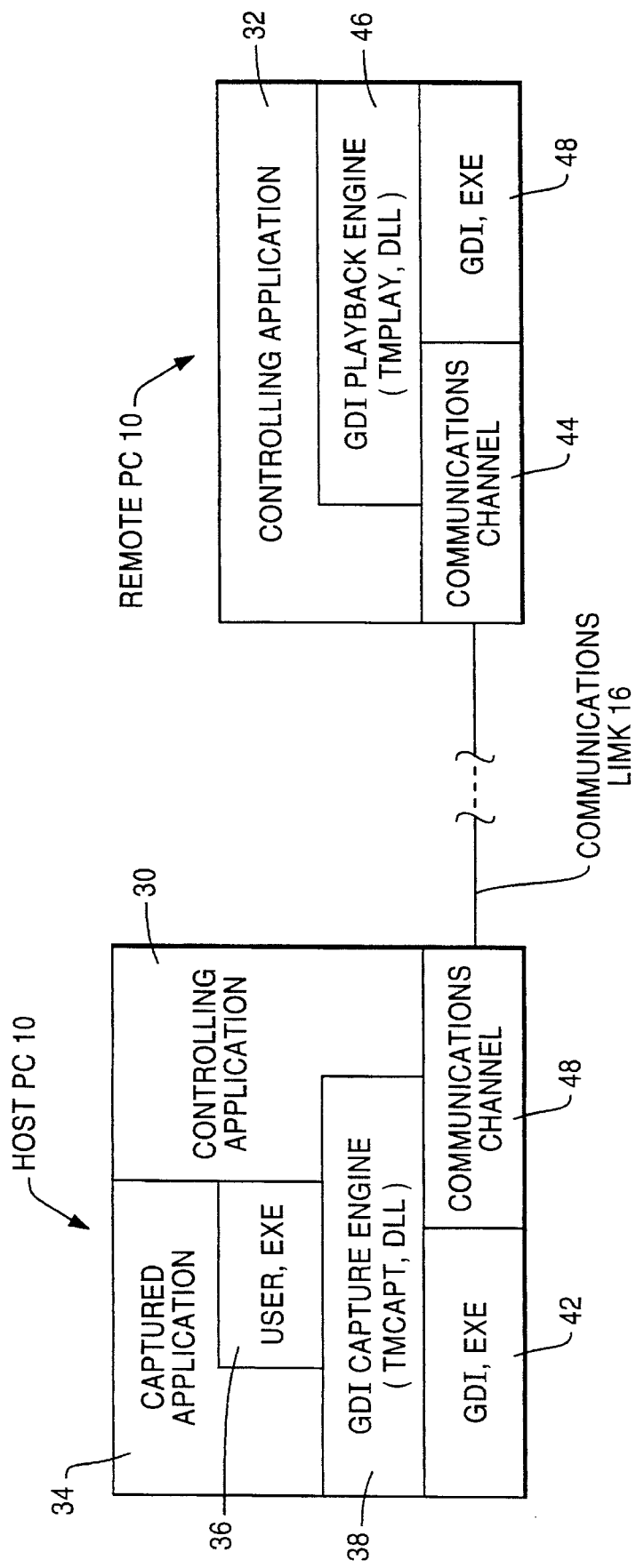
FIG. 3 is a block diagram that illustrates one possible configuration of components that perform the palette management functions in the collaborative system.

FIG. 3 is a block diagram that illustrates one possible configuration of components that perform the palette management functions in the collaborative system. On both the host and remote computers 10, Controlling Applications 30 and 32 perform the overall management of the application sharing and communication functions for the collaborative system. The Controlling Application 30 on the host computer 10 intercepts the user's interaction with a Captured Application 34. The Captured Application 34 invokes various functions of the WINDOWS™ Application Programming Interface (API) 36, including Graphics Device Interface (GDI) functions, to manipulate the display on the monitor 12. Technical details of the WINDOWS™ API and GDI functions can be found in "Windows Software Development Kit" available from Microsoft Corporation, and in *Programming Windows* 3.1 by Charles Petzold, Microsoft Press, 1992, ISBN 1-55615-395-3, both of which are incorporated by reference herein.

The invocation of the WINDOWS™ API and GDI functions are intercepted by the GDI Capture Engine 38, a Dynamic Link Library (DLL) further described in the Microfiche Appendix attached hereto (see, e.g., the various TMCAPT files and other files referenced therein). The captured functions and display images are communicated to the remote computer 10 across the communications link 16 via the Communications Channel 40. Thereafter, the GDI Capture Engine 38 transfers control to the GDI routines 42 to perform the requested GDI functions.

The Communications Channel 44 at the remote computer 10 receives the captured functions and display images, and then communicates this information to the GDI Playback Engine 46, a Dynamic Link Library (DLL) further described in the Microfiche Appendix attached hereto (see, e.g., the various TMPLAY files and other files referenced therein). The GDI Playback Engine 46 performs the requested GDI functions and displays the desired images on the monitor by invoking the GDI routines 48 in a manner similar to the Captured Application 34. Thus, as the display on the monitor 12 of the host computer 10 is altered, this information is communicated to the remote computers 10, so that the display on their monitors 12 will be altered in a like manner.

Note that display images are typically GDI objects. While some objects may comprise bitmaps, in general objects merely comprise a graphical element command or description and its parameters. Thus, bitmaps would rarely be transmitted to remote computers 10 and often would only need to be transmitted once. Further, objects may be compressed, thereby further speeding up the transmission of data between the host computer 10 and the remote computers 10.

Since only the system palette 26 is communicated to the remote computer 10, bitmaps must be manipulated to reflect these operations before being transmitted from the host computer 10 to the remote computer 10. When a device dependent bitmap (DDB), i.e., one that is formatted for the particular video subsystem of the host computer 10, is intercepted by the GDI Capture Engine 38 on the host computer 10 for transmission to the remote computer 10, the DDB must first be converted into a device independent bitmap (DIB) using the currently selected logical palette 28 as the color mapping palette. The conversion will replace logical palette 28 index values contained in the DDB with the actual RGB color values to create the resulting DIB. On the remote computer, the DIB is then converted back into a DDB by GDI Playback Engine 46 on the remote computer 10 using the logical palette 28 of the collaborative system to translate from RGB values into palette indices.

By using palettes in this way, with the conversion performed with the collaborative system's logical palette 28 instead of the remote computer's system palette 26, the currently selected logical palette 28 on the host computer 10 does not have to be transmitted to the remote computer. This saves on transmission bandwidth, and also saves on the problems of handling many logical palettes 28 on the remote computer 10 (which can be extremely difficult).

Computer source code in microfiche form is attached. A description of files contained therein is contained in the following Table.

TABLE

Playback Side (Remote Computer):

| | |
|---|---|
| dibddb.c | Functions responsible for the translations of Device Independent Bitmaps to a Device Dependent format that the GDI Playback machine (the remote) understands |
| gdiobjpy.c | Functions responsible for the creation of GDI objects from object description data that is transmitted from the host machine |
| globals.c | Primary global variable header file |
| globals.h | Secondary global variable header file |
| linklist.c | Functions responsible for the creation and maintenance of the linked lists required for the playback of the GDI calls |
| proto.h | Prototypes for all GDI Playback calls |
| tmplay.c | Code responsible for all exported functions Functions which recreate all GDI calls from the call description data |
| tmplay.h | GDI Playback include file which contains the prototypes for our exported API |
| tmplayp.h | Private structures required for GDI Playback |
| tmplay.def | Module definition file used to create the tmplay executable file |

Capture Side (Host Computer):

| | |
|---|---|
| cache.c | Functions which discern whether an object has to be retransmitted to the remote machine, or whether the currently cached copy can be used |
| dibddb.c | Functions which change all Device Dependent bitmaps to Device Independent bitmaps to guarantee device independence for GDI Capture |
| gdiobjcp.c | Functions for retrieving GDI objects out of the GDI default data heap |
| globals.c | Primary global variable header file |
| globals.h | Secondary global variable header file |
| intercpt.asm | Functions which hook the GDI and Windows calls that must be intercepted |
| linklist.c | Functions to create and maintain the various linked lists used for identifying tasks, objects, Device Contexts, etc. |
| package.c | Functions to queue up GDI Capture remote data packets for efficient utilization of the connection medium |
| proto.h | Prototypes for all GDI Capture calls |
| remote.c | Functions responsible for generating non-graphic remote machine manipulations |
| tmcapt.c | Functions responsible for all exported functions, as well as the state tracking of the window positions |
| tmcapt.h | GDI Capture include file which contains the prototypes for our exported API |
| tmcaptp.h | Private structures required for GDI Capture |
| trap.c | Function which parse the calls that we are intercepting |
| tmcapt.def | Module definition file used to create the tmcapt executable file |

Include Files Common to both Playback and Capture:

| | |
|---|---|
| gdiobj.h | This file contains the data descriptions for the GDI objects |
| pkgtags.h | This file contains the data descriptions for the transmissions id's of the intercepted calls |
| udwgdi.h | This file contains some unimportant data structures not documented in standard windows documentation |
| makefile | File used to build sources to obtain executable object code |

Conclusion

This concludes the description of the preferred embodiment of the invention. In summary, a method and apparatus is disclosed for managing palettes in collaborative systems comprising one or more host computers connected to one or more remote computers, wherein an image displayed on the host computer is substantially simultaneously displayed on the remote computer. The invention recognizes when a change is made to a system palette on the host computer, and communicates those changes to the remote computer. A logical palette is created on the remote computer to reflect the system palette on the host computer, and the changes made therein. A system palette on the remote computer may be updated to reflect the logical palette, and the changes made therein, depending upon whether the collaborative system is active or idle. When sharing images between the host computer and the remote computer, the images must first be translated from their device dependent format using the system palette on the host computer into a device independent image. The device independent image, like the system palette, is transmitted from the host computer to the remote computer. The device independent image is then translated into a device dependent image suitable for display on the remote computer using the logical palette maintained by the collaborative system on the remote computer.

The following paragraphs described some alternative ways of accomplishing the present invention.

Those skilled in the art will recognize that different GUIs, operating environments and operating systems could be substituted for the WINDOWS™ GUI described herein.

Those skilled in the art will recognize that the present invention could be used any type of computer, and need not be limited to a personal computer.

Those skilled in the art will recognize that various forms of communication links between computers 10 could be used with the present invention.

Those skilled in the art will that the present invention could be used any type of display interface, and need not be limited to the WINDOWS™ API.

Those skilled in the art will recognize that alternate approaches to capturing or intercept GDI functions and display images could be substituted for the approach described herein.

Those skilled in the art will recognize that there could be more than one host computer 10 operating at one time. In addition, those skilled in the art will recognize that remote computers 10 could operate as host computers 10 either sequentially or simultaneously with other operating host computers 10.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. In a collaborative system comprising one or more host computers connected to one or more remote computers, the host computer and remote computer each having a system palette, a hardware palette, means for accessing the system palette and hardware palette, and means for updating the hardware palette using the system palette, wherein an image displayed on the host computer is substantially simultaneously displayed on the remote computer, a method of managing palettes used in the image, comprising the steps of:

(a) recognizing when a change is made to the system palette on the host computer;

(b) transmitting the changed system palette from the host computer to the remote computer;

(c) creating a logical palette on the remote computer to reflect the changed system palette received from the host computer; and (d) selectively updating the system palette on the remote computer to reflect the logical palette created on the remote computer.

2. The invention as set forth in claim 1 above, wherein the selectively updating step (d) comprises the step of replacing the system palette on the remote computer with the logical palette when the collaborative system is active on the remote computer.

3. The invention as set forth in claim 2 above, wherein the selectively updating step (d) comprises the step of selectively replacing the system palette on the remote computer with the logical palette when the collaborative system is idle on the remote computer.

4. The invention as set forth in claim 1 above, further comprising the steps of:

intercepting an image displayed on the host computer;

intercepting functions that alter the image on the host computer;

selectively communicating the intercepted image and intercepted functions to the remote computer;

selectively displaying the intercepted image on the remote computer; and altering the intercepted image according to the intercepted functions.

5. The invention as set forth in claim 4 above, further comprising the steps of:

translating a first device dependent image suitable for display on the host computer into a device independent image using the system palette on the host computer;

transmitting the device independent image to the remote computer;

translating the device independent image into a second device dependent image suitable for display on the remote computer using the logical palette on the remote computer; and displaying the second device dependent image.

6. A collaborative system comprising:

(a) one or more host computers connected to one or more remote computers, the host computer and remote computer each having a system palette, a hardware palette, means for accessing the system palette and hardware palette, and means for updating the hardware palette using the system palette;

(b) means for recognizing when a change is made to the system palette on the host computer;

(c) means for transmitting the system palette from the host computer to the remote computer;

(d) means for creating a logical palette on the remote computer to reflect the system palette received from the host computer; and (e) means for selectively updating the system palette on the remote computer to reflect the logical palette created on the remote computer.

7. The invention as set forth in claim 6 above, wherein the means for selectively updating comprises means for replacing the system palette on the remote computer with the logical palette when the collaborative system is active on the remote computer.

8. The invention as set forth in claim 7 above, wherein the means for selectively updating comprises means for selectively replacing the system palette on the remote computer with the logical palette when the collaborative system is idle on the remote computer.

9. The invention as set forth in claim 6 above, further comprising:

means for intercepting an image displayed on the host computer;

means for intercepting functions that alter the image on the host computer;

means for selectively communicating the intercepted image and intercepted functions to the remote computer;

means for selectively displaying the intercepted image on the remote computer; and means for altering the intercepted image according to the intercepted functions.

10. The invention as set forth in claim 9 above, further comprising:

means for translating a first device dependent image suitable for display on the host computer into a device independent image using the system palette on the host computer;

means for transmitting the device independent image to the remote computer;

means for translating the device independent image into a second device dependent image suitable for display on the remote computer using the logical palette on the remote computer; and means for displaying the second device dependent image.

* * * * *